Patented Apr. 19, 1932

1,854,541

UNITED STATES PATENT OFFICE

JOSEPH CASPE AND WILLIAM E. AUSTIN, OF NEW YORK, N. Y., ASSIGNORS, BY MESNE ASSIGNMENTS, TO THE CALCO CHEMICAL COMPANY, INC., OF BOUND BROOK, NEW JERSEY, A CORPORATION OF DELAWARE

PROCESS AND PREPARATION FOR DYEING FURS, HAIRS AND THE LIKE MATERIAL

No Drawing. Application filed December 3, 1926. Serial No. 152,513.

This invention relates to a process and materials for dyeing animal fibres such as hairs, furs, feathers, and the like. The dyes now most generally used in the dyeing of furs and the like materials are the well-known oxidation colors. While these have been used with a fair measure of success, it has been found that where stripping or etching is resorted to for the purpose of obtaining a white shade on portions or the whole of the material, furs that have been dyed with these oxidation colors upon treatment with such stripping or etching reagents have the dyestuffs entirely removed from them or partially destroyed.

One of the objects of this invention is to provide a process and dye which shall overcome this disadvantage of the oxidation colors.

A further object of the invention is to provide a process and dye material which shall be exceedingly simple to carry out and which shall produce upon furs and the like material bright desired shades, and which when stripped or etched will leave the dyed material with a permanent bright white shade.

We accomplish these and other objects more fully hereinafter referred to by the use of the new process and compounds that will now be more fully described.

We have found that the carboxylic compounds of both the benzene and the naphthalene series including their respective homologues and their substitution products which include hydrogen, namely nitro, amino, oxy, alkoxy, aryl, hydroxy, carboxyl, halogens, acyl, alkyl, or aralkyl derivatives produce very bright shades on mordanted animal fibres, such as hairs, furs, feathers, and the like. The compounds referred to are of the general structural formulæ:

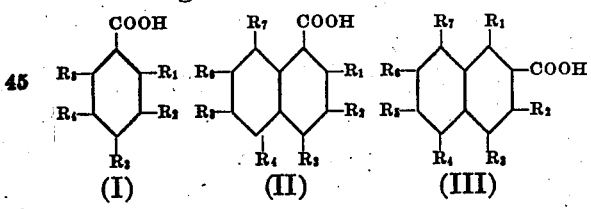

(I) (II) (III)

in which formulæ $R_1$, $R_2$, $R_3$, $R_4$, $R_5$, $R_6$, and $R_7$, mean any of the above-mentioned substitution radicals, such as $NO_2$, $NH_2$, NO, $OCH_3$, $C_6H_5O$, COOH halogen, $C_6H_5$, etc. All the carboxylic compounds of the above mentioned types and their substitution products, we have found, produce very bright and valuable shades especially on iron mordanted animal fibres, such a hairs, furs, feathers, and the like.

Furthermore, we have found that all these carboxylic compounds of the above mentioned series possess the general property of being effectively etched or stripped white when reagents capable of removing them are applied to the animal fibres (hairs, furs, feathers and the like) which have been dyed with any one or combination of the aforementioned compounds; whereas on the other hand, the dyes of oxidation which are customarily used do not possess this property; but on the contrary where animal fibres dyed with oxidation colors are treated with stripping agents, the dyestuffs are either entirely removed or partially destroyed leaving a dull indescribable color not white and of no practical value, and in some instances the color reverts upon exposure to the air to that of the original dyeing.

By our process, we have found,

Firstly, that two or three tone effects may be produced on an iron mordanted animal fibre by applying thereto a compound of the character described. The animal fibre so treated is dyed in a dye-bath of the dyestuff or compounds of dyestuffs aforementioned for several hours. It is then washed and the top surface thereof etched with the ordinary etching reagents, thus producing a two-tone effect. By applying by brush or the well known dip dyeing method a second dyestuff, a three-tone effect may then be obtained.

Secondly, in case of faulty dyeing of the animal fibres, the dye can be quickly and easily stripped by the ordinary etching reagents, such as those hereinafter mentioned leaving the animal fibre in the original mordanted state in a condition suitable and capable of being redyed in any desired shade.

Thirdly, by the use of proper combinations of these carboxylic compounds, any desired effect or shade can be produced and the fibre stripped or etched when desired so as to leave the same in the original mordanted state. An example of the application of our new dyeing process and dyestuffs follows:—

White lambskins are washed in the usual manner with an alkali and thoroughly rinsed. The washed skins are then mordanted with a solution of a ferrous salt, such as ferrous sulphate or pyrolignite of iron using preferably five grams of the ferrous sulphate or 20 grams of the commercial pyrolignite of iron per liter of water. The mordanting is continued for from two to twelve hours preferably overnight. The skins are then washed and dyed in a dye-bath containing two grams of cresotinic acid per liter of water for from two to twelve hours according to the shade desired. This results in a reddish, yellow color. The skins are then washed and dried. A white tipping is then given to the hair by applying thereto by brush a solution of twenty grams of sodium hydrosulfite per liter of water, and the skin then allowed to dry again.

It will be understood that the foregoing only exemplifies our new process and that we are not limited to the example given or to the details thereof hereinabove described and that many variations can be resorted to by those skilled or experienced in the art, all of which come within the scope of the present invention.

Having thus described our invention, we claim as new and desire to secure by Letters Patent:—

1. The herein described process for dyeing animal fabrics or hirsutical material which consists in applying to the hairs, furs, or the like which have been previously mordanted a solution containing at least one aromatic carboxylic compound.

2. The herein described process for dyeing animal fabrics or hirsutical material which consists in applying to the hairs, furs, or the like which have been previously mordanted a solution containing at least one aromatic carboxylic compound of the benzine series.

3. The herein described process for dyeing animal fabrics or hirsutical material which consists in applying to the hairs, furs, or the like which have been previously mordanted a solution containing at least one aromatic carboxylic compound of the naphthalene series.

4. The herein described process for dyeing animal fabrics or hirsutical material which consists in applying to the hairs, furs, or the like which have been previously mordanted a solution containing at least one compound of the general formula

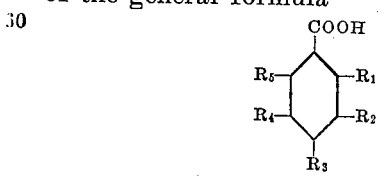

in which R means one of the following: hydrogen, nitro, nitroso, alkoxy, aryloxy, hydroxy, oxy, corboxyl, alkyl, aralkyl, acyl, aryl, halogen.

5. The herein described process for dyeing animal fabrics or hirsutical material which consists in applying to the hairs, furs, or the like which have been previously mordanted a solution containing at least one compound of the general formula

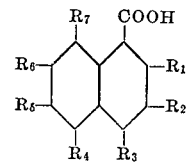

in which R means one of the following: hydrogen, nitro, nitroso, alkoxy, aryloxy, hydroxy, oxy, carboxyl, alkyl, aralkyl, acyl, aryl, halogen.

6. The herein described process for dyeing animal fabrics or hirsutical material which consists in applying to the hairs, furs, or the like which have been previously mordanted, a solution containing at least one compound of the general formula

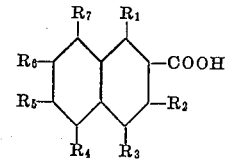

in which R means one of the following: hydrogen, nitro, nitroso, alkoxy, aryloxy, hydroxy, oxy, carboxyl, alkyl, aralkyl, acyl, aryl, halogen.

7. The herein described process for dyeing animal fabrics or hirsutical material which consists in applying to the hairs, furs, or the like which have been previously mordanted, a solution containing at least one aromatic carboxylic compound, and then stripping the dye material with a stripping agent.

8. The herein described process for dyeing animal fabrics or hirsutical material which consists in applying to the hairs, furs, or the like which have been previously mordanted, a solution containing at least one aromatic carboxylic compound series, and then stripping the dye material with a reducing agent.

9. As a new article of manufacture, a dye bath for furs, hairs, and the like comprising cresotinic acid as one of its principal ingredients.

10. The herein described process for dyeing animal fibres or hirsutical material the step which consists in applying to the hairs, furs, or the like, a solution containing cresotinic acid.

11. In a process for dyeing animal fibres or hirsutical material which consists in applying to the hairs, furs, or the like which have been previously mordanted with a solution of ferrous sulphate, a solution containing at least one aromatic carboxylic compound.

12. The herein described process for dyeing animal fibres or hirsutical material which consists in applying to the hairs, furs, or the like which have been previously mordanted with a solution of ferrous sulphate, a solution of cresotinic acid.

13. The herein described process for dyeing animal fabrics or hirsutical material which consists in applying to the hairs, furs or the like, which have been previously mordanted with an iron mordant, a solution containing at least one aromatic carboxylic compound, and then stripping the dye material with a reducing agent.

14. The herein described process for dyeing animal fabrics or hirsutical material which consists in applying to the hairs, furs or the like, which have been previously mordanted with ferrous sulphate, a solution containing cresotinic acid, and then stripping the dyed material with a stripping agent containing sodium hydrosulfite.

In testimony whereof we affix our signatures.

JOSEPH CASPE.
WILLIAM E. AUSTIN.